(No Model.)
H. ENDEMANN.
EXTRACT OF TOBACCO.
No. 438,993. Patented Oct. 21, 1890.
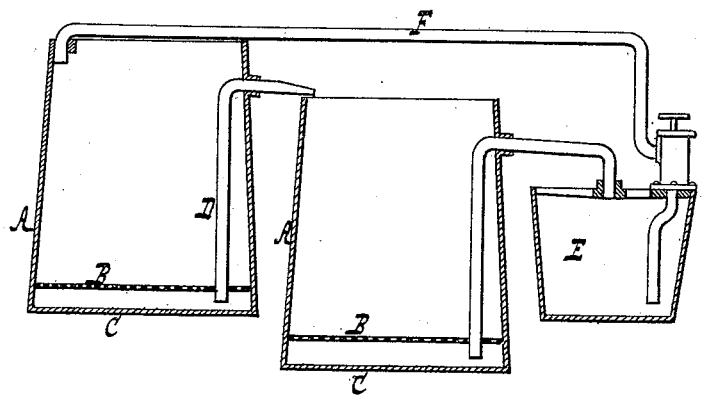
WITNESSES:
William Miller
Edward Wolff
INVENTOR:
Hermann Endemann.
BY
Van Santvoord & Hauff
his ATTORNEYS

UNITED STATES PATENT OFFICE.

HERMANN ENDEMANN, OF BROOKLYN, NEW YORK.

EXTRACT OF TOBACCO.

SPECIFICATION forming part of Letters Patent No. 438,993, dated October 21, 1890.

Application filed June 13, 1889. Serial No. 314,159. (No specimens.)

*To all whom it may concern:*

Be it known that I, HERMANN ENDEMANN, a citizen of the United States, residing at Brooklyn, in the county of Kings and State of New York, have invented new and useful Improvements in Sheep-Wash, of which the following is a specification.

This invention relates to a wash for destroying acari and other parasites which infest the skins of sheep and other animals; and it consists in a wash produced from tobacco, as hereinafter described, reference being had to the accompanying drawing, which shows an arrangement of tanks suitable for leaching the tobacco.

In carrying out the invention I use the stems and waste portions of the tobacco-plant; but the whole plant can be used, if desired. The tobacco is cut into short pieces—say an inch (more or less) in length—and is then crushed by passing it through crushing-rollers. The crushed tobacco is then immersed in a boiling-hot-water solution of a mineral acid, by preference concentrated sulphuric acid, known in commerce as "oil of vitriol," in a leaching-tank A, having a false perforated bottom B, and below the false bottom a chamber C, from which a discharge-pipe D extends upward, preferably, within the tank to a height about a foot below the top of the tank for tanks having a height of from ten to fourteen feet, whence it is conducted outward through the side of the tank and into the top of another adjacent similar tank placed at a lower elevation or into some suitable receptacle E. The liquid in the tank is kept at such a height above the place where the discharge-pipe leaves the tank as to secure a flow of the extract through the pipe.

The proportions of the materials may be as follows, namely: one ton of tobacco, weighed when dry, to about twenty to forty pounds of the said acid and about three tons of water.

The acid having been placed in solution in the water in the leaching-tank and the tobacco immersed therein, the solution is brought to the boiling-point, for accomplishing which purpose live steam may be introduced into the liquor in the tank, and the boiling is continued for about two to four hours, until the soluble portions of the tobacco are dissolved out by the acid, which can be ascertained by examining some of the tobacco, which must, after stirring and disintegrating in pure water, show a pretty uniform but lighter color than the natural color if the action of the acid is to be considered as finished. The boiling is then discontinued, and after a short rest hot water is allowed to flow into the top of the tank, and thereby the heavy solution or extract obtained from the tobacco is forced downward through the false bottom into the chamber below it, and thence upward through the discharge-pipe into another similar tank containing a fresh charge of tobacco, where it may be used for another extraction, being replenished in the second tank by a suitable addition of the acid. In this manner a number of tanks may be employed in series, one after the other, and thereby a highly-concentrated solution of acid tobacco-extract be obtained. I also enrich the extract by conveying it from the receptacle E by means of a pump—for example, through pipe F back to the tanks, and causing it to pass through them again, the tanks being supplied with fresh tobacco.

By means of my acid treatment I obtain an extract which contains about twenty to twenty-five per cent. less of the substances which would go into solution in a water treatment. The twenty to twenty-five per cent. of said substances are substances which would stain the wool if present in the sheep-wash. By means of the acid treatment I exclude them and save the wool from becoming discolored by them.

I add to the tobacco-extract a quantity of carbonate of lime or carbonate of soda sufficient to almost neutralize the solution. A precipitate will form, which consists, mainly, of the phosphates of the alkaline earths which were brought into the solution by the solvent action of the oil of vitriol used in the extraction of the tobacco. The clear liquor is then drawn off and evaporated to the consistence of a sirup, when it is allowed again to settle, and again the liquor is drawn off. This last-mentioned liquor constitutes the sheep-wash above mentioned, for which I ask Letters Patent.

The final product obtained from the foregoing treatment is about three to five hundred pounds, in weight, from about one ton of tobacco, depending on the amount of leaves and stems employed. No precipitate is formed from the said product by the addition thereto of acids. Said product is a brown heavy liquid, and has a fruity flavor, and emits a pungent tobacco odor on the addition of an alkali.

My sheep-wash contains, the consistence being equal, twice the quantity of active vermin-destroyers as the most concentrated extract of which I have any knowledge, hitherto described, owing to the fact that it is freed from unnecessary and harmful impurities. In preparing it for actual use by dilution with water only one-half of the quantity of my product is required as compared with such other extracts.

The fact that in my product no precipitate is formed by the addition of an acid is of importance, because the sweat of the animal contained in the wool is acid, and would, if the fact were otherwise, produce a dirty precipitate upon the wool, and thereby discolor it, which occurs in the use of extracts where such substances are allowed to enter into solution and allowed to remain in solution or suspension, as in the case of ordinary water extracts.

What I claim as new, and desire to secure by Letters Patent, is—

The sheep-wash or product above described, produced from tobacco by extraction with acidulated water and from which the phosphates of the alkaline earths have been removed by precipitation with an alkaline substance, substantially as described.

In testimony whereof I have hereunto set my hand in the presence of two subscribing witnesses.

HERMANN ENDEMANN.

Witnesses:
 FEAN SCHMIDT,
 J. VAN SANTVOORD.